UNITED STATES PATENT OFFICE.

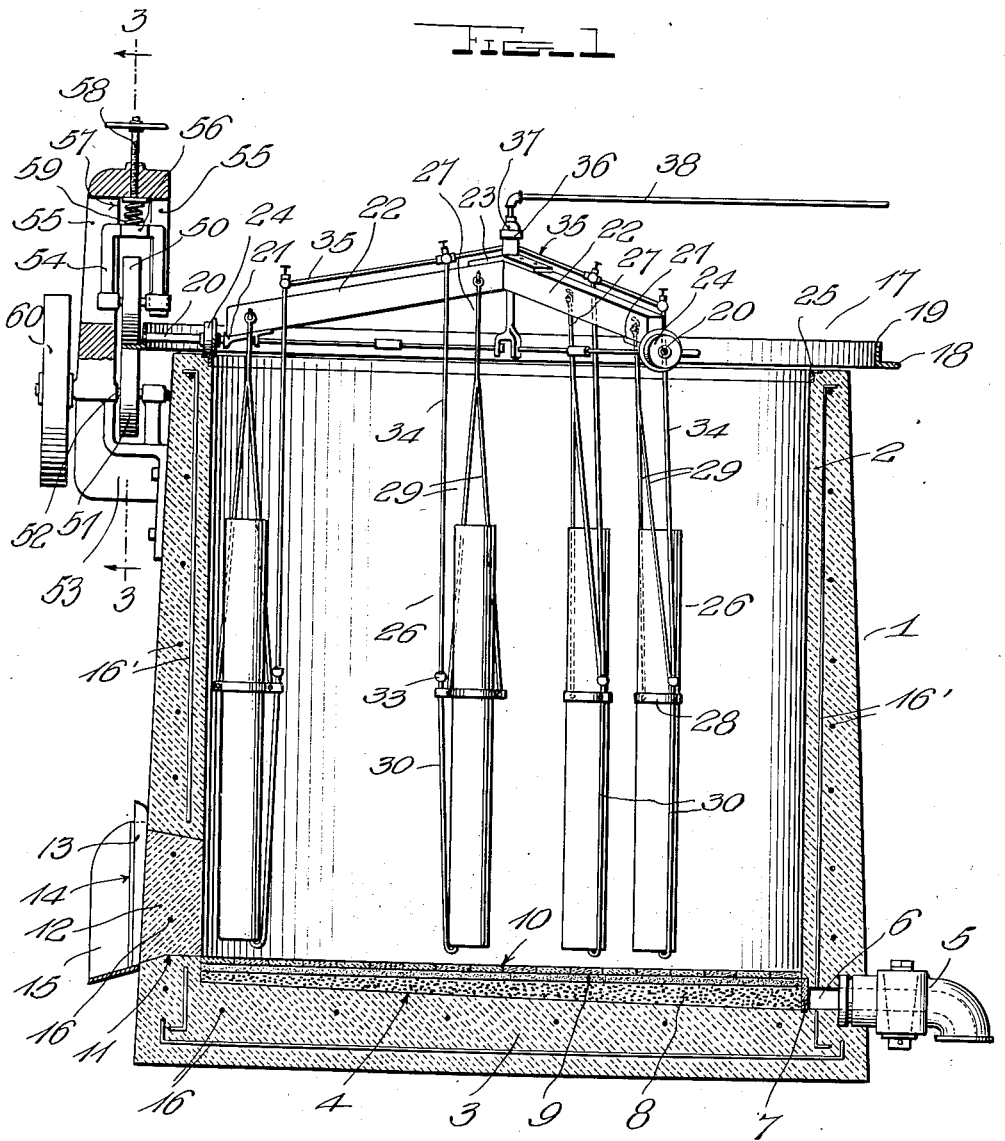

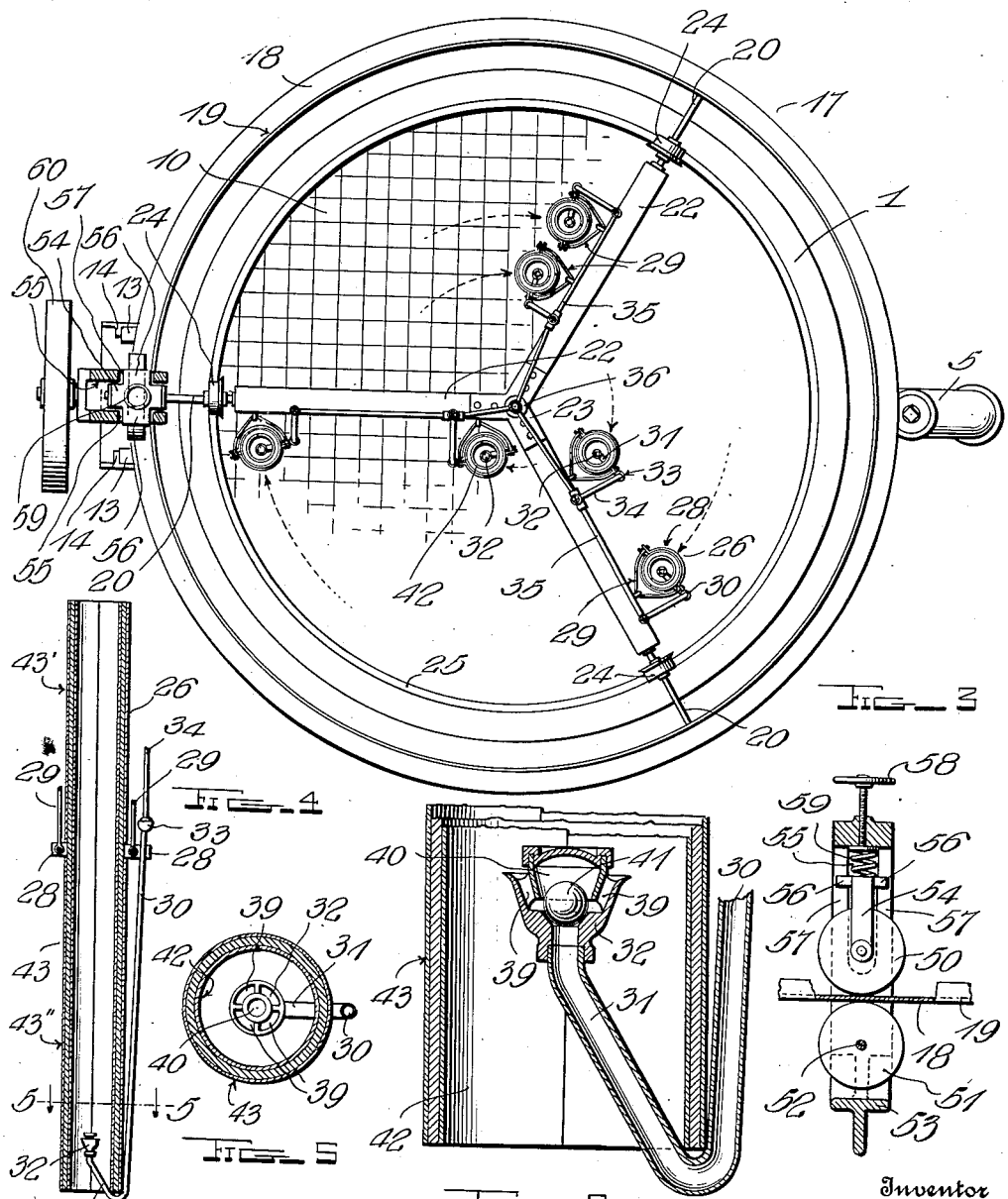

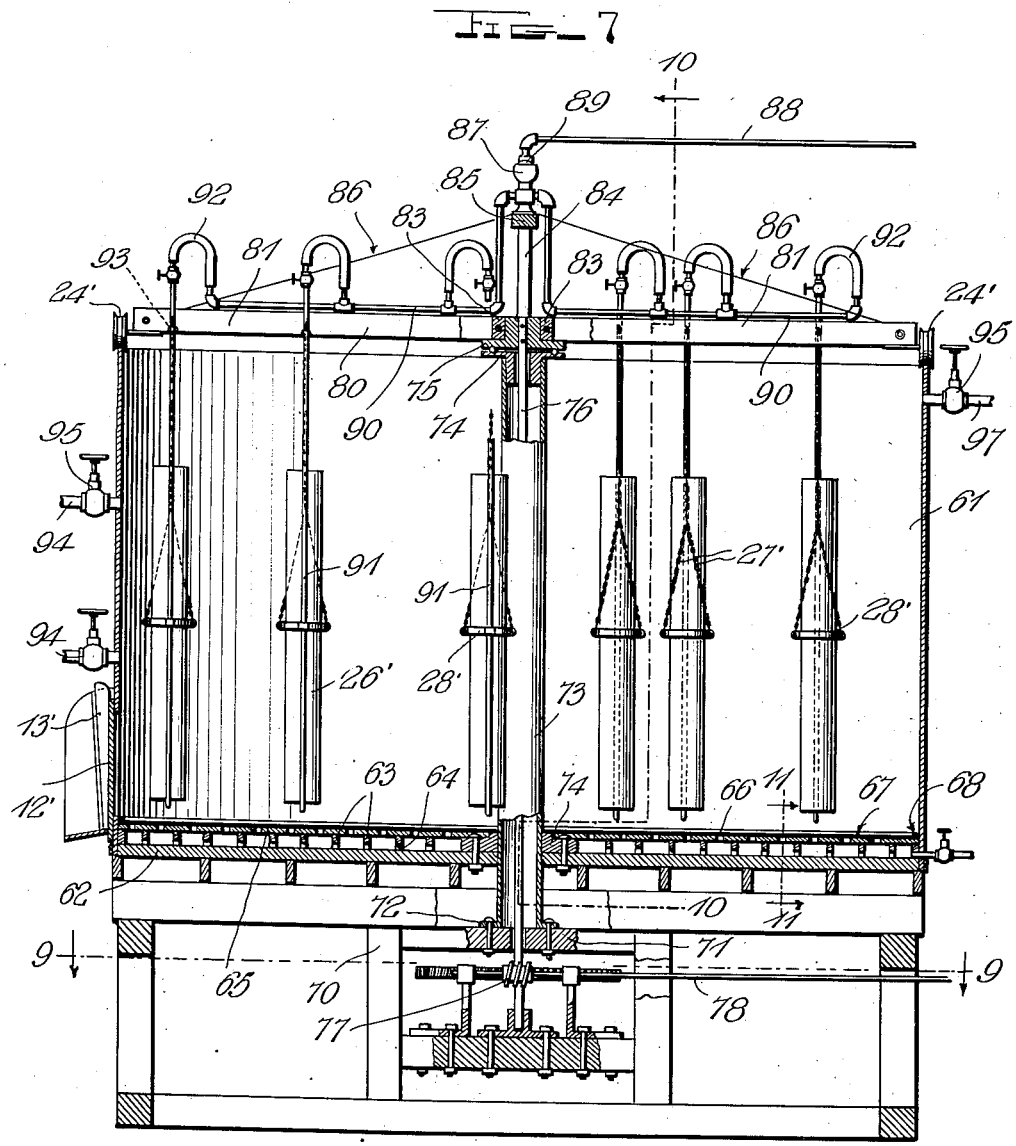

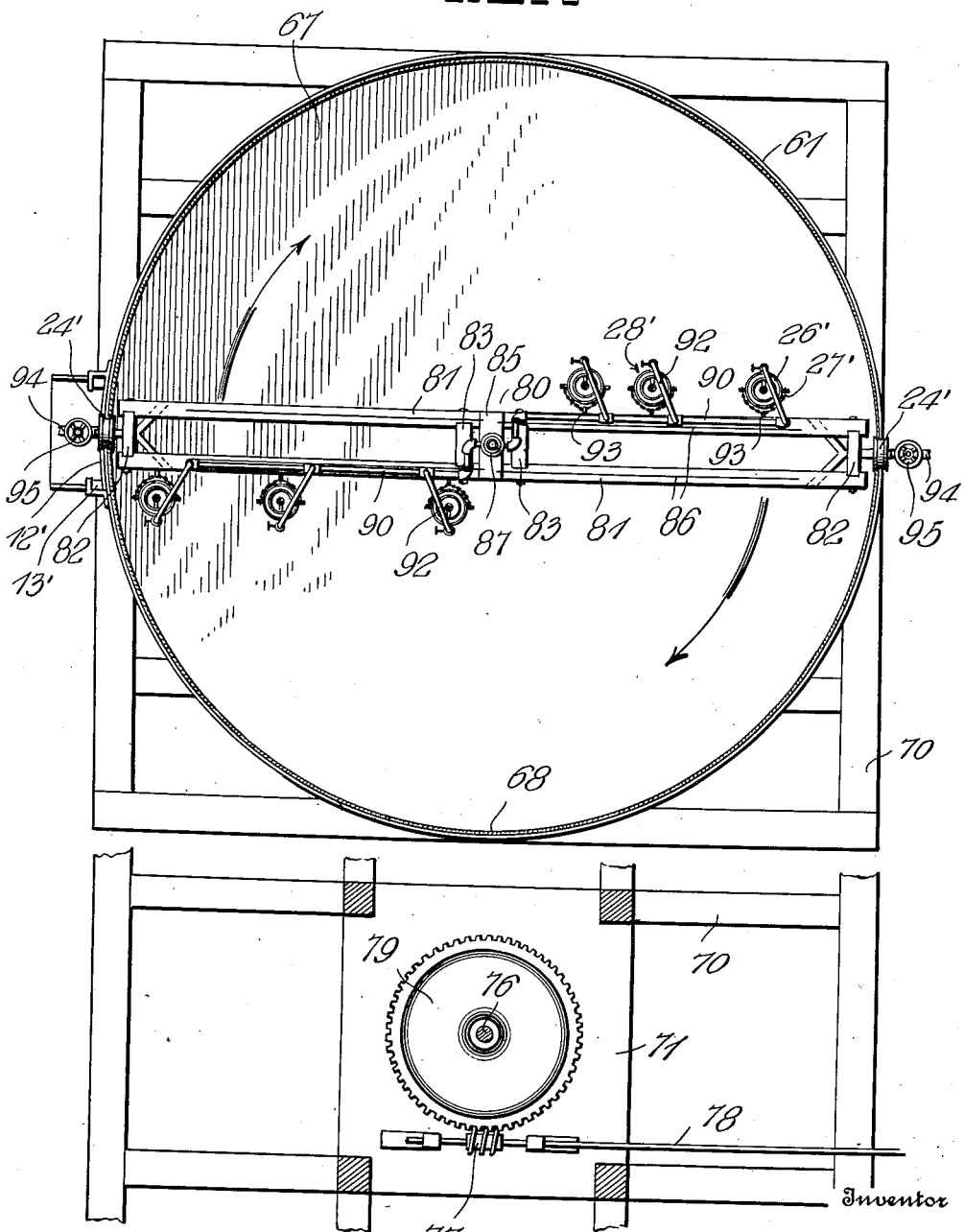

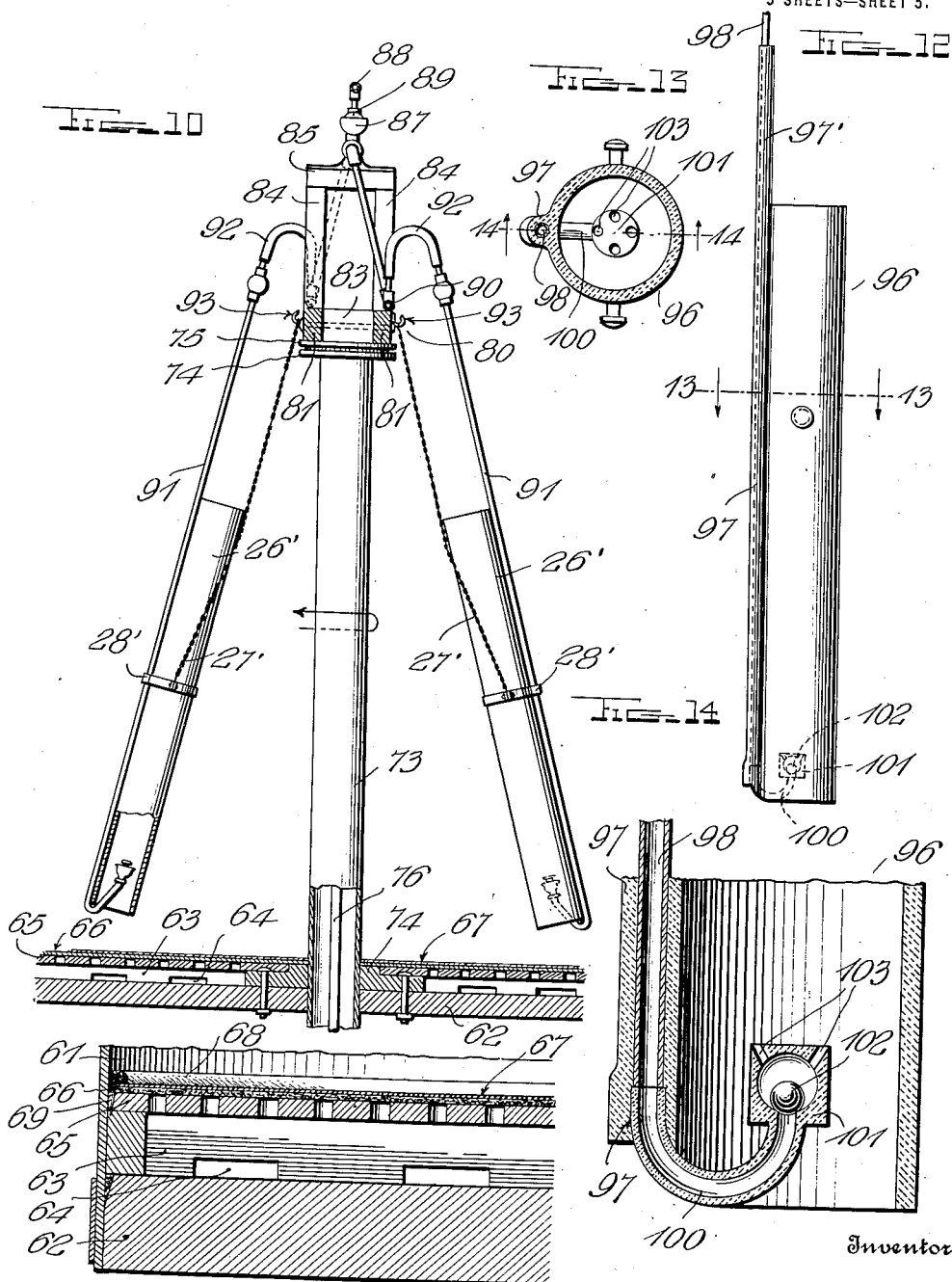

EDWARD HALE DICKIE, OF GOLDROAD, ARIZONA.

PRELIMINARY-TREATMENT TANK.

1,177,394.   Specification of Letters Patent.   Patented Mar. 28, 1916.

Application filed August 6, 1914. Serial No. 855,444.

*To all whom it may concern:*

Be it known that I, EDWARD HALE DICKIE, a citizen of the United States, residing at Goldroad, in the county of Mohave and State of Arizona, have invented certain new and useful Improvements in Preliminary-Treatment Tanks, and I do declare the following to be a full, clear, and exact description of the invention, such as will enable others skilled in the art to which it appertains to make and use the same.

My invention relates to improvements in apparatus for the treatment of numerous kinds of ores, and has for its main object, to provide construction whereby the values within the ores may be brought forcibly into contact with value precipitants, whereby the best results are obtainable.

A second object is to provide, in combination with a leaching tank having a horizontal filter in its bottom, a specific type of agitator, whereby clogging of the filter is prevented; while a third object is to improve upon the general construction of apparatus of the class described.

With these and minor objects in view, the invention resides in certain novel features hereinafter claimed and fully described by reference to the accompanying drawings wherein:—

Figure 1 is a vertical section through a leaching tank showing a number of air lifts therein, in elevation: Fig. 2 is a top plan view of the parts shown in Fig. 1: Fig. 3 is a detail vertical section taken on the line 3—3 of Fig. 1: Fig. 4 is an enlarged vertical section through one of the air lifts: Fig. 5 is a horizontal section taken on the line 5—5 of Fig. 4: Fig. 6 is a vertical section taken through the lower end of one of the air lifts showing more particularly the construction of the spray nozzle therein: Fig. 7 is a view similar to Fig. 1 but showing a slightly different form of supporting frame for the air lifts as well as illustrating a modified construction of leaching tank: Fig. 8 is a top plan view of the parts illustrated in Fig. 7: Fig. 9 is a horizontal section taken on the line 9—9 of Fig. 7: Fig. 10 is a vertical section taken at right angles to Fig. 7 and indicated upon the line 10—10 thereof; Fig. 11 is a detail vertical section taken on the line 11—11 of Fig. 7: Fig. 12 is a side elevation showing a modified construction of air lift: Fig. 13 is a horizontal section taken on the line 13—13 of Fig. 12: Fig. 14 is an enlarged vertical section taken on the line 14—14 of Fig. 13.

In the accompanying drawings from Figs. 1 to 6 inclusive, I have shown an upright leaching tank 1 herein shown as formed of cement or other suitable material having similar characteristics, the annular wall 2 and the solid bottom 3 of said tank being preferably formed integrally. As clearly illustrated in Fig. 1, the upper side of the bottom 3 inclines downwardly from one side of the tank toward the other, a suitable discharge spigot 5 being employed at the low side of said inclined upper surface, said spigot communicating with the interior of the tank through a radial passage 6 whose inner end is substantially closed by a rather coarse filtering tile 7.

Terminating in a plane substantially in horizontal alinement with the upper edge of the opening 6, is a coating 8 of quartz pebbles or gravel, said coating being laid directly upon the inclined surface 4 of the bottom 3 and receiving, upon its upper surface, a coating 9 of sharp sand or quartz above which a third coating 10 of filtering tile is laid, said coating 10 constituting the bottom proper of the tank 1.

Preferably disposed at a point opposite the spigot 5 and communicating directly with the interior of the tank above the filtering bottom, is a tapered discharge opening 11 in which a similarly shaped door 12 is normally seated by means of a wedge or wedges 13 which bear against said door and against suitable guides or stops 14 which are herein shown as carried by the opposite side walls of a U-shaped spout 15. In most cases it becomes expedient to reinforce the door 12 as indicated at 16 and to likewise reinforce the bottom 3 and the annular wall 2 as represented at 16'.

The form of tank, so far described, although acting to effectively strain or filter any liquid solution within the tank, is prone to become clogged and therefore ineffective to a certain degree. It is to overcome this difficulty that the construction now to be described is provided.

Spaced a suitable distance above the upper end of the tank 1 and preferably formed of greater diameter than the same, is an angle iron ring 17 whose horizontal flange 18 projects outwardly, its upright flange 19 being secured to a number of stub shafts 20 which project inwardly therefrom and have their inner ends rigidly mounted in suitable brackets 21 carried by a trio of arms 22 which incline upwardly and inwardly and are united by a suitable plate 23. The shafts 20 revolubly support flanged wheels or pulleys 24 which travel upon an annular angle iron track 25 formed on the upper inner edge of the wall 2, thereby mounting the three arms 22, the ring 17 and parts to be discribed, in such a manner as to allow the same to revolve or rotate.

Suspended from the arms 22 by suitable hangers 27, are a number of air lifts 26 which are here shown in the form of upright tubes around the upper portions of which bands 28 are passed, said bands acting as connections between the bifurcated lower ends 29 of the hangers 27 and said tubes and also acting to secure a number of lower air tube sections 30 in proper position, the lower ends of said sections 30 being turned inwardly and upwardly as seen more particularly at 31 in Figs. 4, 5 and 6, said lower ends carrying spray nozzles 32 which are of a construction to be described, while the upper ends of said sections 30 each carry one member of a ball and socket coupling 33 to the other members of which air tubes 34 are connected at their lower ends, the upper ends of said tubes 34 being in valved communication with a trio of air tubes 35 which overlie the arms 22 and communicate with a coupling 36 which rises from the plate 23, said coupling having a universal connection at 37 with a pressure supply pipe 38.

The nozzles 32 may be of any desired construction provided they be so constructed as to form outwardly and upwardly inclining discharge openings 39 through which the air, under pressure, is forced. Said nozzles are also preferably provided with suitable valve cages 40 within which ball valves 41 are located, said valves acting normally to close the upper ends of the portions 31, constituting the lower ends of the tube sections 30.

The inclined discharge openings 39 are provided in order that a slime or pulp being treated may be forced outwardly, by air pressure, into forcible contact with a lining of value precipitating material 42 one of which is located in each of the lifts 26. As probably most clearly seen in Figs. 5 and 6, a value precipitating casing 43 is provided around the outside of each of said lifts 26, each of said casings being formed in upper and lower sections 43′ and 43″ which are located respectively above and below the bands 28. For the purpose of rotating the frame composed of the three arms 22, I provide upper and lower friction wheels 50 and 51, the latter being mounted upon a horizontal shaft 52 which is revolubly mounted in a bracket 53 secured to the wall 2, said wheel 51 contacting with the under side of the horizontal flange 18 while the wheel 50 contacts with the upper side of said flange and is revolubly mounted in a fork 54 whose arms are mounted for vertical movement in slots 55 formed in the upper end portion of the bracket 53 while oppositely projecting guide shoulders 56, located at right angles to the arms 54, are slidably mounted in upright slots 57 which are likewise formed in the bracket 53, a screw 58 bearing normally against a coiled spring 59 and threaded through the upper end of the bracket 53 acting to normally force said wheel 50 into contact with the flange 18. As clearly seen in the drawings, the shaft 52 may be driven by a suitable pulley 60 or otherwise.

With the parts as above described, the solution to be treated may be placed in the tank and the pulley 60 set in motion, therefore causing the ring 17 to rotate, thus moving the pneumatic lifts 26 through the liquid within the tank during which operation, compressed air is allowed to flow through the pipe 38 to be discharged from the nozzles 32, this discharge of air acting to force the solution within the lifts 26 upwardly therethrough and creating a suction directly above the filtering bottom to the tank thereby not only agitating said solution at all times and causing the same to contact with the linings 42, but effectively preventing the accumulation of any sediment whatever upon the tile coating 10, whereby the filter may operate effectively at all times.

From Figs. 7 to 11 inclusive, I have shown an upright sheet metal tank 61 which corresponds with the tank 1 previously described, said tank, in this case, being provided with a bottom 62 which is preferably though not necessarily formed of red wood, a number of parallel slats 63 which are notched on their lower sides as indicated at 64, being disposed upon the upper side of the bottom 62 and acting to support a perforated false bottom 65 above which a sheet 66 of cocoa fiber and a second sheet 67 of duck are secured preferably by an annular fiber ring 68 through which suitable fastening elements 69 are driven, said elements also passing through the sheet 66 and 67 and into the perforated bottom 65 (see more particularly Fig. 11).

The entire structure thus far described is herein shown as being supported upon a suitable frame 70 upon a horizontal shelf 71 of which an outturned flange 72 of a central upright tube 73 is secured, said tube being also provided with a second laterally extending flange 74 which is secured to the bottom 62 as indicated in Fig. 7 or by other suitable means.

As most clearly seen in Fig. 7, the upper end of the tube 73 terminates in the plane in which the upper end of the tank 61 lies, said upper end of the tube 73 carrying one member 74 of a ball bearing, the opposite member 75 of which is carried by an upright shaft 76 which rises through the tube 73, said shaft being preferably driven by a worm 77 keyed upon a drive shaft 78 and meshing with a worm gear 79 which is keyed upon said shaft 76.

The bearing member 75 rigidly supports a frame 80 which is here shown as including a pair of parallel side bars 81 which are connected respectively at their outer ends and near their centers by transverse bars or blocks 82 and 83. The frame 80 is further provided with a pair of posts 84 which rise from its center and support a transverse bar 85 from which suitable truss wires 86 incline downwardly and outwardly, said wires being attached to the outer ends of said arms 81.

The bar 85 acts not only as a bracing means for the arms 81 but supports a coupling 87 to which an air pressure pipe 88 is universally connected as indicated at 89, said pipe 88 supplying a pair of pressure supply pipes 90 one of which extends outwardly above the right hand end of one of the bars 81 while the opposite tube 90 extends outwardly above the left hand end of the opposite bar (see more particularly Fig. 8). To the tubes 90, upright tubes 91, corresponding to the tubes 34 above described, are connected by flexible tubes 92 as clearly shown in Fig. 7, the intermediate portions of said tubes 91 being secured in position by bands 28' which surround a number of air lifts 26' which are constructed in the same manner as the lifts 26 before described, said bands 28' being provided for the attachment of flexible hangers 27' whose upper ends are preferably secured by means of hooks 93 to the side bars 81.

The operation of the form of invention just described, is as follows: The shaft 78 is rotated by any suitable power, the movement of said shaft acting to rotate the shaft 76 which in turn rotates the bearing member 75 to rotate the arms 81 during which movement they are guided by rollers 24' which are mounted on their outer ends and which run upon the upper edge of the tank 61, the rotation of the bars 81, constituting the frame 80, will of course cause the pneumatic lifts 26 to travel through the solution within the tank thus producing effects set forth in connection with the form of the invention first described. If desired, a number of pipes 94 may be provided, said pipes leading into said tank 61 at different elevations and being provided with cut off valves 95. The tank 61 is also preferably provided with a gate or door 12' which is held normally closed by a wedge 13'.

In Figs. 12 to 14 inclusive, a tubular pneumatic lift 96 is illustrated which is preferably constructed of vitrified clay, said tube having a substantially cylindrical extension 97 formed integrally with one of its sides, said extension rising above said tube as indicated at 97' and receiving throughout its length, a metal air supply tube 98 which communicates with a cylindrical recess 99 in the lower end of said extension 97, said recess receiving one end of a U-shaped pipe 100 which is likewise formed of vitrified material and whose inner end lies concentrically within the lower end of the tube 96 and is formed with a hollow cylindrical head 101 in which a ball valve 102 acts to normally close the free end of said pipe 100, suitable discharge openings 103 being provided in the upper end of the head 101 for obvious reasons. This form of pneumatic lift may be employed with either form of structure previously described, or with any desired form of rotating means and leaching tank.

From the foregoing description, taken in connection with the accompanying drawings it will be seen that comparatively simple apparatus has been employed for carrying out the objects of the invention and that the provision of the pneumatic lifts moving over a filtering bottom to a leaching tank, not only agitates the solutions within the tank but also prevents said filtering bottom from becoming clogged and thereby ineffective.

The solution hereinbefore mentioned may be employed in the tanks or other solutions well known to the art to which the invention relates may be employed for reproducing chemical actions upon the slimes or ores therein.

Having thus described my invention, what I claim is:

1. The combination with a tank having a horizontal filter in its bottom; of a tubular agitator depending into the tank and movable horizontally over said filter, and means for creating an upward current of air in said agitator.

2. The combination with a tank having a horizontal filter in its bottom; of an agitator in said tank, movable horizontally over said filter, and including a fluid pressure discharge nozzle, and means for conveying fluid pressure to said nozzle.

3. The combination with a tank and an exposed value precipitant therein; of an agitator in the tank including a fluid pressure delivery nozzle discharging against said exposed precipitant.

4. The combination with a tank and a horizontally movable support spaced near the top thereof; of an agitator depending from said support and having a fluid pressure discharge nozzle, an exposed value precipitant carried by said agitator and disposed in advance of said nozzle, and means for conveying fluid pressure to said nozzle.

5. The combination with a tank, a tubular agitator therein, and means to create an upward current of air in said agitator; of a value precipitating lining in said agitator.

6. The combination with a tank, a tubular agitator therein, and a fluid discharge nozzle disposed in the lower end of said agitator; of a value precipitant in the latter, and means for conveying fluid pressure to the aforesaid nozzle.

7. The combination with a tank, a tubular agitator therein to be moved through fluid in the tank, a nozzle in the agitator, and means to supply fluid pressure to said nozzle; of a value precipitating lining and a value precipitating covering for said agitator.

8. A device of the class described comprising a tank equipped with an annular track at its upper end, a drive ring spaced outwardly and lying concentric with said track, stub shafts projecting radially inward from said ring above the track, wheels on said track and revolubly mounted on said stub shafts, a frame secured to the inner ends of said shafts, and an agitator depending from the frame into the tank, combined with a bracket secured to the tank, a driving wheel revolubly supported by said bracket and contacting with one side of the drive ring, and upright guideway carried by the bracket, a vertically movable member in said guideway, a spring for forcing said member toward the other side of the ring, and a second wheel carried revolubly by said member and contacting with the last named side of the drive ring.

9. A device of the character described comprising a tank, a tubular agitator therein, a pressure supply tube adjacent said agitator and having its lower end turned inwardly and upwardly into the interior thereof, a hollow head on said upturned end and having a number of outwardly and upwardly inclining outlet openings, a ball valve in said hollow head and normally acting to close said upturned end of the pressure tube, means for supplying pressure to said pipe and means for propelling said agitator.

10. A device of the character described comprising a tank open at its upper end and provided with an annular track thereon, a plurality of supporting rollers on said track, a frame above said tank and supported by said rollers, a driving ring carried by said frame and entirely encircling the same and the rollers, a driven wheel contacting with said ring, and a number of agitators depending from said frame into said tank.

11. A device of the character described comprising an upright tank having its upper end open and equipped with an annular track thereon, an annular drive ring spaced outwardly from and lying concentrically with said track, a number of supporting rollers on said track, stub shafts projecting radially inward from said ring and passing loosely through said rollers, radial arms secured at their outer ends to said stub shafts and connected at their inner ends, a driven wheel contacting with said drive ring, and a number of agitators depending from said arms into said tank.

12. A device of the character described comprising an upright tank having its upper end open and equipped with an annular track thereon, an annular drive ring spaced outwardly from and lying concentrically with said track, a number of supporting rollers on said track, stub shafts projecting radially inward from said ring and passing loosely through said rollers, radial arms secured at their outer ends to said stub shafts and connected at their inner ends, a coupling supported concentrically by said arms, a pressure supply tube having a swiveled connection with said coupling, pressure supply tubes radiating from said coupling, pneumatic agitators suspended from said arms, other supply tubes leading from those radiating from said coupling and discharging into said agitators, and a driven wheel in contact with said drive ring.

In testimony whereof I have hereunto set my hand in presence of two subscribing witnesses.

EDWARD HALE DICKIE

Witnesses:
M. A. Foltz,
E. R. Foltz.